United States Patent
Eilken et al.

(10) Patent No.: US 10,259,163 B2
(45) Date of Patent: Apr. 16, 2019

(54) METHOD AND SYSTEM FOR ADAPTING A 3D PRINTING MODEL

(71) Applicant: Airbus Operations GmbH, Hamburg (DE)

(72) Inventors: Wolfgang Eilken, Hamburg (DE); Memis Tiryaki, Hamburg (DE); Henning Felgenhauer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 662 days.

(21) Appl. No.: 14/947,600

(22) Filed: Nov. 20, 2015

(65) Prior Publication Data
US 2016/0144574 A1 May 26, 2016

(30) Foreign Application Priority Data
Nov. 25, 2014 (EP) .................... 14194746

(51) Int. Cl.
*B29C 67/00* (2017.01)
*B29C 64/386* (2017.01)
(Continued)

(52) U.S. Cl.
CPC ............ *B29C 64/386* (2017.08); *G06T 19/20* (2013.01); *B33Y 10/00* (2014.12); *B33Y 50/00* (2014.12); *G06T 2219/2021* (2013.01)

(58) Field of Classification Search
CPC ....... B29C 64/386; B33Y 10/00; B33Y 50/00; G06T 19/20; G06T 2219/2021
See application file for complete search history.

(56) References Cited

U.S. PATENT DOCUMENTS

| 9,636,869 B2 * | 5/2017 | Kroll .................. B29C 67/0077 |
| 2006/0003095 A1 | 1/2006 | Bullen et al. |

(Continued)

FOREIGN PATENT DOCUMENTS

| DE | 10039143 C1 | 1/2002 |
| DE | 102006062373 A1 | 6/2008 |

(Continued)

OTHER PUBLICATIONS

European Patent Office, European Search Report for European Patent Application No. 14194746.5 dated Jul. 15, 2015.
(Continued)

*Primary Examiner* — Abdelmoniem I Elamin
(74) *Attorney, Agent, or Firm* — Lorenz & Kopf LLP

(57) ABSTRACT

A method for adapting a 3D printing model includes calculating a layer representation model on the basis of a 3D object model of an object; determining a plurality of overhang regions in the layer representation model where the boundary edges of first layers extend over the boundary edges of second layers, the first layers being directly adjacent and subsequent to the second layers when going into the build-up direction of the layer representation model; determining a local overhang angle in each of the plurality of overhang regions; adapting the layer representation model by re-defining the boundary edges of layers in the overhang regions so that the local overhang angle remains below a predetermined overhang threshold angle; and outputting the adapted layer representation model as 3D printing model to the 3D printing apparatus.

11 Claims, 1 Drawing Sheet

(51) Int. Cl.
*G06T 19/20* (2011.01)
*B33Y 10/00* (2015.01)
*B33Y 50/00* (2015.01)

(56) References Cited

U.S. PATENT DOCUMENTS

| | | | |
|---|---|---|---|
| 2014/0251481 A1* | 9/2014 | Kroll | B29C 67/0077 138/106 |
| 2014/0305529 A1* | 10/2014 | Kroll | B29C 67/0077 138/111 |
| 2015/0246488 A1* | 9/2015 | Boettcher | G06T 11/203 264/40.1 |
| 2016/0200051 A1* | 7/2016 | Urbanic | B29C 67/0088 264/308 |
| 2017/0348915 A1* | 12/2017 | Boettcher | B29C 64/40 |

FOREIGN PATENT DOCUMENTS

| | | |
|---|---|---|
| DE | 102008031926 A2 | 1/2010 |
| DE | 102012008371 A1 | 10/2013 |
| EP | 1952932 A2 | 8/2008 |
| WO | 2013160192 A1 | 10/2013 |

OTHER PUBLICATIONS

Reiss, Dominic, Complex Processes and 3D Printing, Jun. 10, 2013, Imperial College, London, pp. FP-18.
Salinas, Richard, "3D Printing with RepRap Cookbook", Jun. 2014, Packt Publishing, pp. 200-202.

* cited by examiner

METHOD AND SYSTEM FOR ADAPTING A 3D PRINTING MODEL

CROSS-REFERENCE TO RELATED APPLICATIONS

This application claims priority to European Patent Application No. 14194746.5, filed Nov. 25, 2014, which is incorporated herein by reference in its entirety.

TECHNICAL FIELD

The embodiments described herein relate to a method and a system for adapting a 3D printing model, in particular for use in additive layer manufacturing (ALM), selective laser sintering (SLS) and/or solid freeform fabrication (SFF) processes.

BACKGROUND

Additive layer manufacturing (ALM), selective laser sintering (SLS) and solid freeform fabrication (SFF) techniques, generally termed as 3D printing techniques, may be used in procedures for building up three-dimensional solid objects based on digital model data. Such 3D printing employs an additive process where layers of material are sequentially built up in different shapes. The 3D printing is currently used for prototyping and distributed manufacturing with multiple applications in engineering, construction, industrial design, automotive industries and aerospace industries. For example, document DE 10 2009 034 566 A1 discloses a method for manufacturing a fuel tank employing a generative layer manufacturing procedure.

Such 3D printing systems usually employ a combination of a computer-aided design (CAD) system and an operational 3D printing tool that performs the layer manufacturing on the basis of a manufacturing model generated by the CAD system. A three-dimensional CAD digital representation of the component to be manufactured is subjected to a so-called "slicing" procedure where the digital model is sliced up into layers of a predetermined thickness with the orientation of the layers being perpendicular to the printing direction of the 3D printing tool. A common layering procedure involves building up a tessellated surface model. Such models are built by intersecting sets of horizontal planes with the three-dimensional CAD digital representation, resulting in a multitude of closed curves or polygons. The space between any two consecutive horizontal planes is referred to as a "slice".

The layer model may for example be described in stereolithography (STL) format which only describes the surface geometry of a three-dimensional object as raw unstructured triangulated surface using a three-dimensional Cartesian coordinate system. The 3D printing tool is capable of reading and interpreting STL models in order to generate each layer of the component to be printed using one of several specific physical fabrication processes, such as selective laser sintering (SLS) or Fused Deposition Modeling (FDM).

When building up a component layer by layer according to a digitalized layer model, most regions of a layer under construction are self-supported, i.e. the layer under construction is built up directly on top of the previously built-up layer. However, there may be regions of a layer under construction that extend sideways, i.e. perpendicular to the printing direction of the printing tool, beyond the planar extension of the previously built-up layer. Forming a tangent between the outermost point of a previously built-up layer and the outermost point of the layer under construction will yield an overhang angle between the axis normal to the plane of extension of the layers and the resulting tangent.

Regions with steep walls, i.e. with a low overhang angle, tend to be completely self supporting. Parts with shallower walls, i.e. with a high overhang angle, will exhibit problems during the built-up process since the upper layer will not be sufficiently supported by the existing lower layers. Depending on the type and characteristics of the manufacturing material and the printing conditions, such as manufacturing speed, temperature or layer thickness, the threshold for the overhang angle beyond which a layer under construction will not be sufficiently supported by the lower layers any more will vary.

A conventional measure for allowing the formation of overhang structures with overhang angles above the threshold is to provide additional supporting structures or elements along the shallower walls.

As alternative, document DE 10 2012 008 371 A1 discloses a method for manufacturing a component having an overhang which comprises iteratively carrying out the process steps of applying a layer section with predetermined dimensions of a particulate material in a predetermined region on a base layer, and heating the layer section by means of a heat source in such a manner that the particles of the material within predetermined dimensions bond. A local buildup angle occurring between two consecutive layer sections of an overhang is not allowed to exceed a predetermined maximum buildup angle to a perpendicular of the base layer.

SUMMARY

It is an object to provide a solution for efficiently forming overhang or undercut structures in layer manufacturing methods.

It is an object to provide a method for adapting a 3D printing model, the method comprising calculating a layer representation model on the basis of a 3D object model of an object, the layer representation model being built up from a multitude of coplanar and confined adjacent layers, wherein the build-up direction corresponds to a printing direction of a 3D printing apparatus; determining a plurality of overhang regions in the layer representation model where the boundary edges of first layers extend over the boundary edges of second layers, the first layers being directly adjacent and subsequent to the second layers when going into the build-up direction of the layer representation model; determining a local overhang angle in each of the plurality of overhang regions, the local overhang angle being defined as the angle between the normal axis of the coplanar layers in build-up direction and the local tangent between the boundary edges of two adjacent layers; adapting the layer representation model by re-defining the boundary edges of layers in the overhang regions so that the local overhang angle remains below a predetermined overhang threshold angle; and outputting the adapted layer representation model as 3D printing model to the 3D printing apparatus.

According to a further of the embodiment, a system for adapting a 3D printing model comprises a calculation module configured to receive 3D object model of an object as input and to calculate a layer representation model on the basis of the received 3D object model, the layer representation model being built up from a multitude of coplanar and confined adjacent layers, wherein the build-up direction corresponds to a printing direction of a 3D printing apparatus; a determination module coupled to the calculation module and configured to receive the calculated layer representation model, to determine a plurality of overhang regions in the layer representation model where the boundary edges of first layers extend over the boundary edges of second layers, the first layers being directly adjacent and subsequent to the second layers when going into the build-up direction of the layer representation model, and to determine a local overhang angle in each of the plurality of overhang regions, the local overhang angle being defined as the angle between the normal axis of the coplanar layers in build-up direction and the local tangent between the boundary edges of two adjacent layers; and an adaptation module coupled to the determination module and configured to adapt the layer representation model by re-defining the boundary edges of layers in the overhang regions so that the local overhang angle remains below a predetermined overhang threshold angle, and to output the adapted layer representation model as 3D printing model.

It is a further object to modify the 3D printing process on the slice or layer representation level by replacing cavity, undercut and/or overhang structures with structures that are self-supporting during the 3D printing process. This may alter the geometric shape of the printed 3D component, however, the exact shape of cavities, through-holes, vias or other concave structures within the component often allows flexibility with respect to the intended technical or technological use or purpose.

The solution offers great advantages for 3D printing or additive manufacturing (AM) technology since 3D components may be printed without the additional need for external support elements. This allows for a more efficient, material saving and time saving 3D printing process.

Particularly advantageous in general is the reduction of costs, weight, lead time, part count and manufacturing complexity coming along with employing AM technology for printing structural components of airborne vehicles. Moreover, the geometric shape of the printed structural components may be flexibly designed with regard to the intended technical purpose of parts or regions of the component.

According to an embodiment of the method and the system, at least one of the overhang regions may correspond to an upper arc of a cylindrical cavity structure in the 3D object model of the object. According to another embodiment of the method and the system, at least one of the overhang regions may correspond to a spheroid cap of a spheroidal cavity structure in the 3D object model of the object. Circular or spheroidal recess or via structures are often used for pilot, tack or fixation holes that are needed in structural components. However, for such holes the final geometric shape may be defined by a drilling or screwing process after the structural component has already been printed so that the exact outer shape of the cavity structures will not be as crucial for the technical functionality of the printed structural component.

According to another embodiment of the method, adapting the layer representation model may include re-defining the boundary edges of layers in the overhang regions so that the upper arc of the cylindrical cavity structure is re-defined as triangular prism.

According to another embodiment of the method, adapting the layer representation model may include re-defining the boundary edges of layers in the overhang regions so that the spheroid cap of a spheroidal cavity structure is re-defined as cone.

According to another embodiment of the method, adapting the layer representation model may include re-defining the boundary edges of layers in the overhang regions so that the whole cylindrical cavity structure is re-defined as triangular prism.

According to another embodiment of the method, adapting the layer representation model may include re-defining the boundary edges of layers in the overhang regions so that the whole cylindrical cavity structure is re-defined as Reuleaux triangular prism.

According to another embodiment of the system, the adaption module may be configured to re-define the boundary edges of layers in the overhang regions so that the upper arc of the cylindrical cavity structure is re-defined as triangular prism.

According to another embodiment of the system, the adaption module may be configured to re-define the boundary edges of layers in the overhang regions so that the spheroid cap of a spheroidal cavity structure is re-defined as cone.

According to another embodiment of the system, the adaption module may be configured to re-define the boundary edges of layers in the overhang regions so that the whole cylindrical cavity structure is re-defined as triangular prism.

According to yet another embodiment of the system, the adaption module may be configured to re-define the boundary edges of layers in the overhang regions so that the whole cylindrical cavity structure is re-defined as Reuleaux triangular prism.

BRIEF DESCRIPTION OF THE DRAWINGS

The various embodiments will hereinafter be described in conjunction with the following drawing figures, wherein like numerals denote like elements, and.

The accompanying drawings are included to provide a further understanding of the present embodiment and are incorporated in and constitute a part of this specification. The drawings illustrate the embodiments of the present embodiment and together with the description serve to explain the principles of the embodiment. Other embodiments of the present embodiment and many of the intended advantages of the present embodiment will be readily appreciated as they become better understood by reference to the following detailed description. The elements of the drawings are not necessarily to scale relative to each other. Like reference numerals designate corresponding similar parts.

Figure 1:
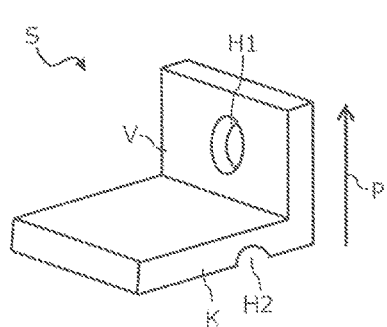
FIG. 1 schematically illustrates an exemplary structural component in isometric view.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Although specific embodiments have been illustrated and described herein, it will be appreciated by those of ordinary skill in the art that a variety of alternate and/or equivalent implementations may be substituted for the specific embodiments shown and described without departing from the scope of the present embodiment. Generally, this application is intended to cover any adaptations or variations of the specific embodiments discussed herein.

Free form fabrication (FFF), direct manufacturing (DM), fused deposition modeling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and additive layer manufacturing (AM) belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

FIG. 1 schematically illustrates an exemplary structural component S in isometric view. The structural component S may be any type of shaped component that may be integrally manufactured using an AM or 3D printing technique. The structural component S may in particular be fabricated integrally, from any material suitable for an AM or 3D printing technique. Without loss of generality, the structural component S may be 3D printed in a 3D printing direction referred to with the arrow P, i.e. the 3D printing process involves selectively depositing material layer by layer with the deposited material layers being coplanar to each other and having a normal axis corresponding to the 3D printing direction.

The structural component S is exemplarily shown as an angled bracket or chevron having a horizontal portion K and a vertical portion V. For example, the structural component S may serve as a fixation bracket for fuselage structures in an airborne vehicle. Structural components such as the structural component S may be printed with internal cavities, openings or similar hollow spaces. For example, as shown in FIG. 1, the vertical portion V may comprise a cylindrical hollow H1 or via with as circular or otherwise rounded inner wall structure that may serve as a pilot, tack or fixation hole for bolts, studs, pins or similar fastening elements protruding through the hollow. Alternatively or additionally, the structural component S may comprise a recess, gap, cut or notch H2 that is formed into a bottom surface of the horizontal portion K of the structural component S.

Both cavity structures H1 and H2 have in common that upon printing the structural component S some portions of the layers in the region of the cavity structures will not be supported by underlying layers having previously been formed. In particular, this applies to any of the arcs in the upper circumferential boundaries of the cavity structures H1 and H2. Since the printing material in most, if not all, 3D printing techniques will be additively applied to the underlying layers in a non-solid state of matter, there will be certain difficulties in 3D printing any overhangs or undercuts associated with unsupported arcs: Printing material applied during the 3D printing process may fall down or droop from the boundary edges of the underlying layers of already printed portions, leading to flaws in or deviations from the desired shape to be printed.

Conventionally, support elements may be introduced into the shape to be printed that confine to the outer shape of the cavity structures. However, the introduction (and subsequent removal) of support elements in 3D printed components is cumbersome and usually not very efficient, neither in terms of time spent nor flexibility with respect to different geometries of the cavity structures.

Figure 2:
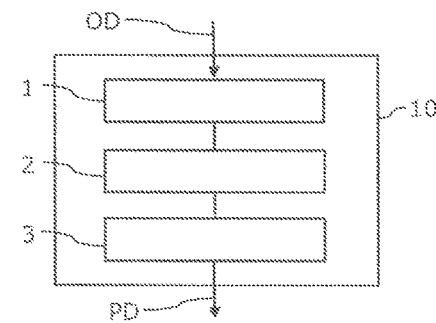
FIG. 2 schematically illustrates a system for adapting a 3D printing model according to an embodiment.
Figure 6:
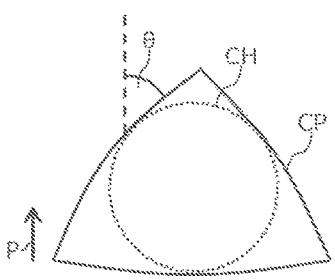
FIG. 6 schematically illustrates a simplified detail view of a layer representation model of an exemplary structural component to be manufactured according to an embodiment.
Figure 7:
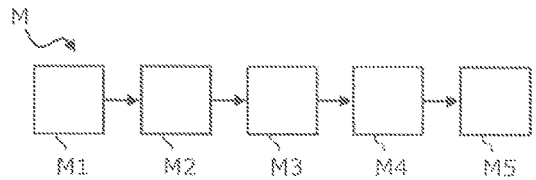
FIG. 7 schematically illustrates a flow diagram of a method for adapting a 3D printing model according to an embodiment.

Therefore, a system 10 for adapting a 3D printing model, as exemplarily illustrated in FIG. 2, and a method M for adapting a 3D printing model, as exemplarily illustrated in the flow diagram of FIG. 7 may be employed in order to avoid the need for support elements in 3D printing structural components having cavity structures such as the ones exemplarily depicted as H1 and H2 in FIG. 1. Reference is made to FIGS. 3, 4, 5 and 6 all of which show schematical illustrations of simplified detail views of a layer representation model that corresponds to an exemplary structural component to be 3D printed.

Figure 3:
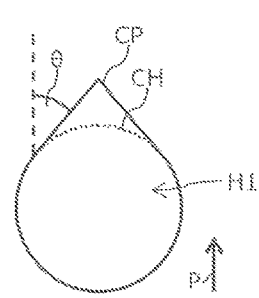
FIG. 3 schematically illustrates a simplified detail view of a layer representation model of an exemplary structural component to be manufactured according to an embodiment.

FIG. 3 shows a cross-sectional view of an exemplary cavity structure H1 along a plane parallel to the printing direction P of a 3D printing apparatus that is used to print a structural component including this cavity structure H1. The cavity structure H1 is shown as having a circular boundary CH, i.e. the inner region of the circular boundary CH is free from material, while the exterior of the circular boundary CH is to be printed with material.

At each point on the circumference of the circular boundary CH a tangent to the circular boundary CH may be defined. The tangent will, depending on the location of the point on the circumference, enclose a local overhang angle $\theta$ with the printing direction P, as exemplarily depicted for one such point in FIG. 3.

Figure 4:
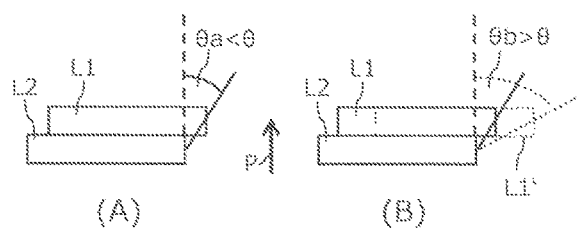
FIG. 4 schematically illustrates a simplified detail view of a layer representation model of an exemplary structural component to be manufactured according to an embodiment.

FIG. 4 schematically illustrates a more detailed view of the circular boundary CH for a local overhang region. A first layer L1 is to be additively manufactured on top of a second layer L2, both layers being coplanar and having an axis normal that coincides with the printing direction P. The first layer L1 includes a certain portion that has boundary edges which extend over the boundary edges of the underlying second layer L2, thereby forming an overhang where the extended portion of the first layer L1 is unsupported or at least only partially supported by the second layer L2 underneath. When defining a tangent line through the outmost points of the boundary edges of both the first and second layers L1 and L2, the resulting local tangent will enclose a local overhang angle with the normal axis of the layers L1 and L2.

In the exemplary scenario (A) of FIG. 4, this local overhang angle $\theta a$ is smaller than a predetermined local overhang threshold angle θ, i.e. an angle where the upper layer L1 is still sufficiently supported by the lower layer L2 with respect to a proper 3D printing procedure. In other words, if the local overhang angle θa does not exceed the predetermined local overhang threshold angle θ, the first layer L1 may be printed on top of the second layer L2 without external supporting elements, while at the same time the risk for flaws or defects in the resulting 3D printed structural component is below an acceptable risk threshold. The predetermined local overhang threshold angle θ may vary depending on the material used for 3D printing and/or the characteristics of the employed 3D printing technique, such as printing speed, printing temperature, layer thickness and other factors.

If, however, the local overhang angle θb is larger than the predetermined local overhang threshold angle θ—as exemplarily illustrated in scenario (B) of FIG. 4—, then it will be necessary to re-define the boundary edges of at least one of the layers L1 and L2. For example, it may be possible to trim or pare back the boundary edges of the upper layer L1 to such an extent that the local overhang angle remains below the predetermined local overhang threshold angle θ again. This may be done iteratively, i.e. for each subsequent layer in printing direction the respectively trimmed last layer may be taken as reference for the determination of the local overhang angle θ.

In effect, this may lead to a re-defined cavity structure CP which contains partial replacements or re-definitions of upper arcs of the cylindrical cavity structure H1 in the 3D object model of the object. Those re-defined cavity structure CP may be two-dimensional or three-dimensional. For a two-dimensional cavity structure H1, i.e. a structure that has the same cross-section over the whole depth of the structural component, the boundary edges of layers in the overhang regions may be re-defined as triangular prism, as shown in FIG. 3. For a three-dimensional cavity structure H1, the upper arcs may form a spheroid cap of a spheroidal cavity structure which are re-defined as a cone.

Figure 5:
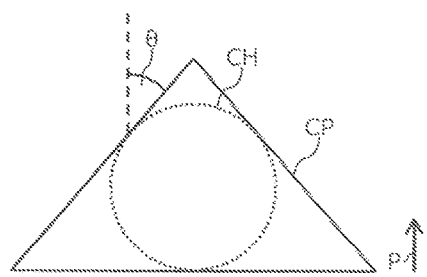
FIG. 5 schematically illustrates a simplified detail view of a layer representation model of an exemplary structural component to be manufactured according to an embodiment.

FIG. 5 schematically illustrates a cross-sectional view of an exemplary cavity structure along a plane parallel to the printing direction P of a 3D printing apparatus. The cavity structure is exemplarily shown as having a circular cavity boundary CH. The circular cavity boundary CH in the layer representation model is re-defined as triangular prism CP. The re-definition may be performed by re-defining the boundary edges of layers of the cavity structure, similarly to the procedure as described in conjunction with FIGS. 3 and 4.

FIG. 6 schematically illustrates a cross-sectional view of another exemplary cavity structure along a plane parallel to the printing direction P of a 3D printing apparatus. The cavity structure is exemplarily shown as having a circular cavity boundary CH. The circular cavity boundary CH in the layer representation model is re-defined as Reuleaux triangle CP, i.e. a closed plane curve consisting of three arcs, each of which arcs joins two of three vertices of an equilateral triangle and is part of a circle that is centered at the remaining third vertex. The re-definition may be performed by re-defining the boundary edges of layers of the cavity structure, similarly to the procedure as described in conjunction with FIGS. 3, 4 and 5.

FIG. 2 schematically illustrates a block diagram of a system 10 for adapting a 3D printing model PD. A calculation module 1 of the system 10 is configured to receive 3D object model OD of an object as input and to calculate a layer representation model on the basis of the received 3D object model OD. The layer representation model may be built up from a multitude of coplanar and confined adjacent layers such as the exemplarily depicted layers L1 and L2 of FIG. 4. The build-up direction of the layer representation model corresponds to a printing direction P of a 3D printing apparatus for which the 3D printing model PD is adapted.

The calculation module 1 is coupled to a determination module 2 that is configured to receive the calculated layer representation model. The determination module 2 is further configured to determine a plurality of overhang regions in the layer representation model. The overhang regions are such regions in which the boundary edges of first layers L1 extend over the boundary edges of second layers L2, the first layers L1 being directly adjacent and subsequent to the second layers L2 when going into the build-up direction of the layer representation model. The determination module 2 further is configured to determine a local overhang angle θa, θb in each of the plurality of overhang regions. The local overhang angle θa, θb is defined as the angle between the normal axis of the coplanar layers L1, L2 in build-up direction and the local tangent between the boundary edges of two adjacent layers.

The determination module 2 is coupled to an adaptation module 3 which receives the determined parameters of the layer representation model. The adaptation module 3 is configured to adapt the received layer representation model by re-defining the boundary edges of layers in the overhang regions so that the local overhang angle θa, θb remains below a predetermined overhang threshold angle θ. This re-defined and adapted layer representation model is then output as 3D printing model PD to a 3D printing apparatus.

The system 10 may for example be implemented in a general purpose data processing apparatus which may be configured to read computer-executable instructions on a computer-readable medium. Those computer-executable instructions may, when executed on the data processing apparatus, cause the data processing apparatus to perform a respective adaptation method for adapting a 3D printing model PD. In particular, the computer-executable instructions may involve instructions which correspond to the respective method steps M1 to M5 of the method M as exemplarily shown in FIG. 7.

FIG. 7 shows a schematic illustration of a flow diagram of a method M for adapting a 3D printing model PD. At M1, a layer representation model on the basis of a 3D object model OD of an object is calculated, the layer representation model being built up from a multitude of coplanar and confined adjacent layers, wherein the build-up direction corresponds to a printing direction P of a 3D printing apparatus. At M2, a plurality of overhang regions in the layer representation model is determined. The overhang regions are those regions where the boundary edges of first layers L1 extend over the boundary edges of second layers L2, the first layers L1 being directly adjacent and subsequent to the second layers L2 when going into the build-up direction of the layer representation model.

At M3, a local overhang angle is determined in each of the plurality of overhang regions. The local overhang angle is defined as the angle between the normal axis of the coplanar layers in build-up direction and the local tangent between the boundary edges of two adjacent layers. Based on the local overhang angles, the layer representation model is adapted at M4 by re-defining the boundary edges of layers in the overhang regions.

This re-definition is done in such a way that the local overhang angle always remains below a predetermined overhang threshold angle. The overhang threshold angle may be determined depending on the intended 3D printing technique and/or the material used for 3D printing. The overhang threshold angle particularly defines an angle below which the second layers L2 are still able to support any extended portion of upper first layers L1 without the 3D printing process resulting in the introduction of flaws or defects in the printed component.

Finally, at M5, the adapted layer representation model is output as 3D printing model PD to the 3D printing apparatus. The 3D printing apparatus may then print the structural component with modified inner cavity structures, without having to resort to external support elements for supporting the printing process of the inner cavity structures. The adapted layer representation model will ensure that the cavity structures of the structural component have a shape that complies with the self-supporting capabilities of the printing material in the additive manufacturing carried out by the 3D printing apparatus. The modified shapes may for example correspond to partly re-defined upper arc or undercut domes, as exemplarily shown and explained in conjunction with FIG. 3. Alternatively or additionally, the modified shapes may completely replace the original shape of the cavity structures, for example by replacing cylindrical cavity structures with triangular prisms or Reuleaux triangular prisms, as exemplarily shown and explained in conjunction with FIGS. 5 and 6.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the embodiment and its practical applications, to thereby enable others skilled in the art to best utilize the embodiment and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for adapting and using a 3D printing model, the method comprising:
    calculating a layer representation model on the basis of a 3D object model of an object, the layer representation model being built up from a multitude of coplanar and confined adjacent layers, wherein the build-up direction corresponds to a printing direction of a 3D printing apparatus;
    determining a plurality of overhang regions in the layer representation model where the boundary edges of first layers extend over the boundary edges of second layers, the first layers being directly adjacent and subsequent to the second layers when going into the build-up direction of the layer representation model, each of the plurality of overhang regions corresponding to an upper arc of a cylindrical cavity structure or a spheroid cap of a spheroidal cavity structure in the 3D object model of the object;
    determining a local overhang angle in each of the plurality of overhang regions, the local overhang angle being defined as the angle between the normal axis of the coplanar layers in build-up direction and the local tangent between the boundary edges of two adjacent layers;
    adapting the layer representation model by re-defining the boundary edges of layers in the overhang regions so that the local overhang angle remains below a predetermined overhang threshold angle;
    outputting the adapted layer representation model as a 3D printing model to the 3D printing apparatus; and
    operating the 3D printing apparatus to print a structural component in accordance with the outputted 3D printing model.

2. The method according to claim 1, wherein adapting the layer representation model includes re-defining the boundary edges of layers in the overhang regions so that the upper arc of the cylindrical cavity structure is re-defined as triangular prism.

3. The method according to claim 1, wherein adapting the layer representation model includes re-defining the boundary edges of layers in the overhang regions so that the spheroid cap of a spheroidal cavity structure is re-defined as cone.

4. The method according to claim 2, wherein adapting the layer representation model includes re-defining the boundary edges of layers in the overhang regions so that the whole cylindrical cavity structure is re-defined as triangular prism.

5. The method according to claim 1, wherein adapting the layer representation model includes re-defining the boundary edges of layers in the overhang regions so that the whole cylindrical cavity structure is re-defined as Reuleaux triangular prism.

6. A 3D printing system for adapting and using a 3D printing model, the system comprising:
    a computer-executable calculation module of a data processing apparatus, configured to receive 3D object model of an object as input and to calculate a layer representation model on the basis of the received 3D object model, the layer representation model being built up from a multitude of coplanar and confined adjacent layers, wherein the build-up direction corresponds to a 3D printing direction;
    a computer-executable determination module of the data processing apparatus, coupled to the calculation module and configured to receive the calculated layer representation model, to determine a plurality of overhang regions in the layer representation model where the boundary edges of first layers extend over the boundary edges of second layers, the first layers being directly adjacent and subsequent to the second layers when going into the build-up direction of the layer representation model, each of the plurality of overhang regions corresponding to an upper arc of a cylindrical cavity structure or a spheroid cap of a spheroidal cavity structure in the 3D object model of the object, and to determine a local overhang angle in each of the plurality of overhang regions, the local overhang angle being defined as the angle between the normal axis of the coplanar layers in build-up direction and the local tangent between the boundary edges of two adjacent layers;

a computer-executable adaptation module of the data processing apparatus, coupled to the determination module and configured to adapt the layer representation model by re-defining the boundary edges of layers in the overhang regions so that the local overhang angle remains below a predetermined overhang threshold angle, and to output the adapted layer representation model as a 3D printing model; and a 3D printing apparatus coupled to receive the outputted 3D printing model, and configured to print a structural component in accordance with the outputted 3D printing model.

7. The system according to claim 6, wherein the adaptation module is configured to re-define the boundary edges of layers in the overhang regions so that the upper arc of the cylindrical cavity structure is re-defined as triangular prism.

8. The system according to claim 6, wherein the adaptation module is configured to re-define the boundary edges of layers in the overhang regions so that the spheroid cap of a spheroidal cavity structure is re-defined as cone.

9. The system according to claim 7, wherein the adaptation module is configured to re-define the boundary edges of layers in the overhang regions so that the whole cylindrical cavity structure is re-defined as triangular prism.

10. The system according to claim 6, wherein the adaptation module is configured to re-define the boundary edges of layers in the overhang regions so that the whole cylindrical cavity structure is re-defined as Reuleaux triangular prism.

11. A non-transitory computer-readable medium comprising computer-executable instructions which, when executed on a data processing apparatus, cause the data processing apparatus to perform a method for adapting a 3D printing model, the method comprising:

calculating a layer representation model on the basis of a 3D object model of an object, the layer representation model being built up from a multitude of coplanar and confined adjacent layers, wherein the build-up direction corresponds to a printing direction of a 3D printing apparatus;

determining a plurality of overhang regions in the layer representation model where the boundary edges of first layers extend over the boundary edges of second layers, the first layers being directly adjacent and subsequent to the second layers when going into the build-up direction of the layer representation model, each of the plurality of overhang regions corresponding to an upper arc of a cylindrical cavity structure or a spheroid cap of a spheroidal cavity structure in the 3D object model of the object;

determining a local overhang angle in each of the plurality of overhang regions, the local overhang angle being defined as the angle between the normal axis of the coplanar layers in build-up direction and the local tangent between the boundary edges of two adjacent layers;

adapting the layer representation model by re-defining the boundary edges of layers in the overhang regions so that the local overhang angle remains below a predetermined overhang threshold angle; and outputting the adapted layer representation model as a 3D printing model to the 3D printing apparatus for printing a structural component in accordance with the outputted 3D printing model.

* * * * *